US011286213B2

(12) United States Patent
Kim et al.

(10) Patent No.: US 11,286,213 B2
(45) Date of Patent: Mar. 29, 2022

(54) CONTROLLED-RELEASE FERTILIZERS

(71) Applicants: LG CHEM, LTD., Seoul (KR); FARMHANNONG CO., LTD., Seoul (KR)

(72) Inventors: Chanjoong Kim, Daejeon (KR); Sangryeo Lee, Daejeon (KR); Joon Seok Lee, Daejeon (KR); Yil Jang, Daejeon (KR); Ji Yeon Kim, Sejong (KR); Jae Hoon Choe, Daejeon (KR)

(73) Assignees: LG Chem, Ltd., Seoul (KR); FarmHannong Co., Ltd., Seoul (KR)

(*) Notice: Subject to any disclaimer, the term of this patent is extended or adjusted under 35 U.S.C. 154(b) by 0 days.

(21) Appl. No.: 16/964,924

(22) PCT Filed: Mar. 18, 2019

(86) PCT No.: PCT/KR2019/003120
§ 371 (c)(1),
(2) Date: Jul. 24, 2020

(87) PCT Pub. No.: WO2019/190103
PCT Pub. Date: Oct. 3, 2019

(65) Prior Publication Data
US 2021/0040008 A1    Feb. 11, 2021

(30) Foreign Application Priority Data

Mar. 28, 2018  (KR) .................. 10-2018-0035998
Mar. 11, 2019  (KR) .................. 10-2019-0027741

(51) Int. Cl.
  *C05G 3/40*     (2020.01)
  *C05G 5/12*     (2020.01)
  *C05G 5/35*     (2020.01)

(52) U.S. Cl.
  CPC ................ *C05G 3/40* (2020.02); *C05G 5/12* (2020.02); *C05G 5/35* (2020.02)

(58) Field of Classification Search
  None
  See application file for complete search history.

(56) References Cited

U.S. PATENT DOCUMENTS 4,002,458 A  * 1/1977 Hofacker ............... C05G 5/35
                                                 71/27
4,019,890 A  * 4/1977 Fujita ..................... B01J 2/006
                                              71/64.11
(Continued)

FOREIGN PATENT DOCUMENTS

CN        87105398 A     1/1988
CN        1195966 A     10/1998
(Continued)

*Primary Examiner* — Wayne A Langel
(74) *Attorney, Agent, or Firm* — Dentons US LLP

(57) ABSTRACT

The present disclosure relates to a controlled-release fertilizer and, more particularly, to a controlled-release fertilizer comprising a photodegradable capsule including a binder resin containing a polyolefin and an ethylene vinyl acetate copolymer; and a photocatalytic composite in which a surfactant having an HLB value of 1 to 6 is bonded to the surface or inside of aggregates of inorganic fine particles, and a fertilizer contained in a space surrounded by the photodegradable capsule.

15 Claims, 1 Drawing Sheet

(56) References Cited

U.S. PATENT DOCUMENTS

| | | | | |
|---|---|---|---|---|
| 4,369,055 | A | * | 1/1983 | Fujita ........................ B01J 2/30 71/64.11 |
| 5,009,696 | A | | 4/1991 | Fujita et al. |
| 5,176,734 | A | * | 1/1993 | Fujita ........................ C05G 5/37 71/11 |
| 6,036,971 | A | | 3/2000 | Kimoto et al. |
| 6,500,223 | B1 | | 12/2002 | Sakai et al. |
| 2011/0162955 | A1 | | 7/2011 | Butzloff et al. |
| 2015/0258033 | A1 | | 9/2015 | Yang et al. |

FOREIGN PATENT DOCUMENTS

| | | | |
|---|---|---|---|
| CN | 1854111 | A | 11/2006 |
| CN | 102010000 | A | 4/2011 |
| CN | 103588561 | A | 2/2014 |
| CN | 103980738 | A | 8/2014 |
| CN | 103588561 | B | 10/2015 |
| CN | 105636922 | A | 6/2016 |
| CN | 106102723 | A | 11/2016 |
| EP | 0976699 | A1 * | 2/2000 ............... C05G 3/00 |
| JP | 7-61884 | A | 3/1995 |
| JP | 9-268103 | A | 10/1997 |
| JP | H11-071192 | A | 3/1999 |
| JP | 11-114429 | A | 4/1999 |
| JP | 2001-031489 | A | 2/2001 |
| JP | 2003-342095 | A | 12/2003 |
| JP | 2005-324981 | A | 11/2005 |
| JP | 2016-003169 | A | 1/2016 |
| KR | 1999-0035939 | A | 5/1999 |
| KR | 2000-0071159 | A | 11/2000 |
| KR | 10-2004-0034787 | A | 4/2004 |
| KR | 10-0362798 | B1 | 1/2005 |
| KR | 10-2010-0110949 | A | 10/2010 |
| KR | 10-1331454 | B1 | 11/2013 |
| KR | 10-2013-0133895 | A | 12/2013 |
| KR | 10-1410859 | B1 | 7/2014 |
| WO | 1998-037039 | A1 | 8/1998 |
| WO | 2008-089140 | A1 | 7/2008 |
| WO | 2010-117168 | A2 | 10/2010 |
| WO | 2017-100858 | A1 | 6/2017 |
| WO | 2018/033913 | A1 | 2/2018 |

\* cited by examiner

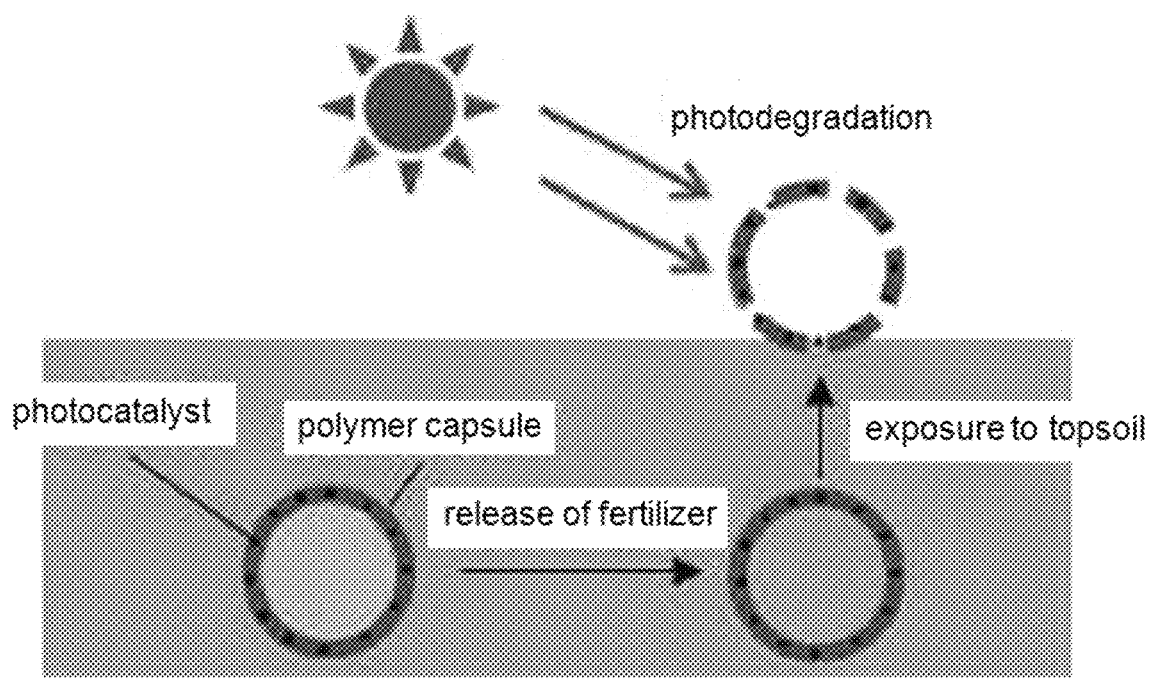

CONTROLLED-RELEASE FERTILIZERS

CROSS-REFERENCE TO RELATED APPLICATION(S)

The present application is a National Phase entry pursuant to 35 U.S.C. § 371 of International Application No. PCT/KR2019/003120 filed on Mar. 18, 2019, and claims priority to and the benefits of Korean Patent Application No. 10-2018-0035998 filed with Korean Intellectual Property Office on Mar. 28, 2018 and Korean Patent Application No. 10-2019-0027741 filed with Korean Intellectual Property Office on Mar. 11, 2019, the entire contents of which are incorporated herein by reference

FIELD

The present invention relates to a controlled-release fertilizer. More specifically, the invention relates to a controlled-release fertilizer having a high stability against moisture and a rigid structure, and capable of easily controlling a release period of a fertilizer and further realizing excellent photodegradation efficiency.

BACKGROUND

Various controlled-release fertilizers have been developed for the purpose of labor-saving fertilization, or for exhibiting the effect of a fertilizer according to the growth of plants.

In these controlled-release fertilizers (CRF), fertilizer components such as nitrogen, phosphorus and potassium are slowly supplied to crops for a long period of time.

Conventional fertilizers, which are sprayed by mixing with water or sprayed in the form of powder, are usually difficult to sustain the effect for more than 20 days when sprayed once.

This is because fertilizer components are washed away in the rain or deeply penetrated underground and thus, it is difficult for crops to absorb fertilizer components. Because of these problems, the fertilizer must be frequently sprayed in an excessive amount.

In order to complement the drawbacks of such general fertilizer, the controlled-release fertilizer reduces the release rate of the fertilizer components with a polymer capsule so that it is released for a long period of time.

The polymer capsule is made of olefin-based resins, urethane-based resin, latex, acrylic resin, etc. While water vapor penetrates through the capsules, the fertilizer components are dissolved, and then is released through the capsules by the principle of osmotic pressure.

The penetration rate of water and the fertilizer components varies depending on the type of components for preparing capsules, and the thickness of the capsules.

This can be used to control the rate at which the fertilizer components are released to the outside.

The period during which the fertilizer components are released from the capsule can be adjusted from a minimum of 30 days to a maximum of 2 years.

However, there is a problem that the capsule polymer remains in soils or in streams without being degraded after the release of the fertilizer.

In order to solve these problems, attempts have been made to use a biodegradable polymer as a capsule material. However, because biodegradable polymers have a rapid moisture penetration and are degraded by microorganisms within a period of 1 month to 6 months, and thus are not suitable to be used for the controlled-release fertilizers which must be released over a period from a minimum of 1 month to 2 years.

SUMMARY

An object of the present invention is intended to provide a controlled-release fertilizer having a high stability against moisture and a rigid structure, and capable of easily controlling a release period of a fertilizer, and further realizing excellent photodegradation efficiency.

In one aspect of the invention, there is provided a controlled-release fertilizer including: a photodegradable capsule including a binder resin containing a polyolefin and an ethylene vinyl acetate copolymer; and a photocatalytic composite in which a surfactant having an HLB value of 1 to 6 is bonded to the surface or inside of aggregates of inorganic fine particles, and a fertilizer contained in a space surrounded by the photodegradable capsule.

Hereinafter, the controlled-release fertilizer according to specific embodiments of the present invention will be described in more detail.

According to one embodiment of the present invention, there can be provided a controlled-release fertilizer including: a photodegradable capsule including a binder resin containing a polyolefin and an ethylene vinyl acetate copolymer; and a photocatalytic composite in which a surfactant having an HLB value of 1 to 6 is bonded to the surface or inside of aggregates of inorganic fine particles, and a fertilizer contained in a space surrounded by the photodegradable capsule.

The present inventors have found through experiments that the controlled-release fertilizer in which the photodegradable capsule including the above-mentioned photocatalytic composite together with the binder resin containing a polyolefin and an ethylene vinyl acetate copolymer has been formed can have a high stability against moisture and a rigid structure, and capable of easily controlling a release period of a fertilizer and further realizing excellent photodegradation efficiency, thereby completing the present invention.

The characteristic of the above-mentioned controlled-release fertilizer may also be attributed to uniformly dispersing the photocatalytic composite in the above-mentioned binder resin.

Specifically, as the surfactant having an HLB value of 1 to 6 is bonded to the surface or inside of the aggregates of inorganic fine particles, the inorganic fine particles can be uniformly dispersed during the manufacturing process of the controlled-release fertilizer or in the controlled-release fertilizer, and accordingly, the aggregates of inorganic fine particles may have a particle size that is not so large.

As described above, the photocatalytic composite may have a structure in which a surfactant having an HLB value of 1 to 6 is bonded to the surface or inside of aggregates of inorganic fine particles.

The structure and characteristics of such a photocatalytic composite can be obtained by first reacting the surfactant having an HLB value of 1 to 6 and the aggregates of the inorganic fine particles, or by first dispersing and mixing them in an organic solvent followed by dispersing in or reacting with the binder resin or a precursor thereof.

In this way, the aggregates of the inorganic fine particles are uniformly dispersed in the binder resin while having a particle size that is not so large, and when the photodegradable capsule is exposed to light, the photodegradation reaction occurs locally, thereby making it possible to prevent the phenomenon that the photodegradation efficiency is deteriorated, and also to prevent the photodegradable capsule from remaining in soils.

The characteristic of the controlled-release fertilizer may be attributed to the binding of the surfactant having an HLB value of 1 to 6 to the surface or inside of the aggregates of inorganic fine particles.

That is, as the surfactant having an HLB value of 1 to 6 is bonded to the surface or inside of the aggregates of inorganic fine particles, the growth of the aggregates of inorganic fine particles may be controlled, and also, due to the characteristics of the surfactant having an HLB value of 1 to 6, it may have higher compatibility with the binder resin, so that the photocatalytic composite can be uniformly distributed in the binder resin.

As described above, the surfactant may have HLB values [hydrophilic-lipophilic balance, HLB] from 1 to 6, or from 1 to 5, or from 1 to 4, or from 2 to 4.

When the HLB value of the surfactant contained in the photocatalytic composite is higher than the above range, the solubility of the coating solution in the hydrophobic solvent is low or the ability to disperse the particles in the coating solution may be decreased and thus, the photocatalytic composite can be unevenly distributed in the capsule. Moreover, the surfactant may have low compatibility with the binder resin.

For example, if a surfactant having an HLB value of greater than 6 is used, a local photodegradation reaction may occur in the photodegradable capsule or the efficiency of the photodegradation reaction may be lowered, and due to the inefficient photodegradation reaction, the entire photodegradable capsule may not be degraded and residues may remain.

As described above, the controlled-release fertilizer can realize excellent photodegradation efficiency.

More specifically, when a light having a wavelength of 300 to 800 nm is irradiated to the fertilizer at an intensity of 400 w/m$^2$ for 224 hours, the degradation rate of the binder resin derived from the weight change of the photodegradable capsule may be 40% or more, or 50% or more.

The inorganic fine particles may act as a photocatalyst.

The controlled-release fertilizer of the embodiment is characterized by uniformly dispersing the photocatalytic composite in the binder resin in order to solve the problem that the photodegradable capsule remains in soils.

The photocatalytic composite can act as a catalyst only when it receives light. Therefore, during the release of the fertilizer in soils where light is blocked, the fertilizer is gradually released during the release period in a state where the photodegradable capsule is not degraded.

Then, when the controlled-release fertilizer is exposed to a topsoil by plowing, etc., after the fertilizer has been released, the photodegradable capsule may be degraded by light.

The inorganic fine particle may include a primary particle having a cross-sectional diameter of 5 to 50 nm.

The cross-sectional diameter of the primary particles of the inorganic fine particles may be confirmed by a commonly known method, for example, through a TEM image, a BET measurement, and the like.

If the cross-sectional diameter of the primary particles contained in the inorganic fine particles is too small, the degree of crystallization may be decreased and thus the photocatalytic efficiency may be deteriorated.

In addition, if the cross-sectional diameter of the primary particles contained in the inorganic fine particles is too large, the specific surface area of the photocatalyst particles may be reduced and thus the photocatalytic efficiency may be deteriorated.

Meanwhile, the aggregates of inorganic fine particles contained in the controlled-release fertilizer of the embodiment may have a particle size that is not so large. Specifically, the aggregates of inorganic fine particles may have a cross-sectional diameter of 1 μm or less, or a cross-sectional diameter of 0.05 μm to 0.8 μm.

The cross-sectional diameter of the aggregates of inorganic fine particles may be confirmed by a commonly known method, for example, through SEM or TEM microtome.

As the surfactant having an HLB value of 1 to 6 is bonded to the surface or inside of the aggregates of the inorganic fine particles, the cross-sectional diameter can be adjusted within the above-mentioned range.

If the cross-sectional diameter or the overall size of the aggregates of inorganic fine particles is too large, a local photodegradation reaction may occur in the photodegradable capsule, or the efficiency of the photodegradation reaction may be deteriorated. In addition, due to the inefficient photodegradation reaction, the entire photodegradable capsule may not be degraded and residues may remain.

Specific examples of the inorganic fine particles include titanium dioxide ($TiO_2$), zinc oxide (ZnO), or a mixture thereof.

Meanwhile, the binder resin may be a main material for forming the outer structure of the photodegradable capsule, and as described above, the binder resin may include a polyolefin and an ethylene vinyl acetate copolymer.

Examples of the polyolefin are not particularly limited, but for example, it may include a high-density or low-density polyethylene, a linear low-density polyethylene, a polypropylene, an ethylene-propylene copolymer, a polybutene, a butene-ethylene copolymer and a butene-propylene copolymer, a mixture of two or more thereof, or a copolymer of two or more thereof.

The ethylene vinyl acetate copolymer contained in the binder resin is also not particularly limited, and for example, an ethylene vinyl acetate copolymer containing 1% to 45% by weight of a vinyl acetate repeating unit may be used.

Further, the ethylene vinyl acetate copolymer may have a melt index of 0.5 g/10 min to 5.0 g/10 min or 1.0 g/10 min to 3.0 g/10 min, as measured at 190° C. under a load of 2.16 kg according to ASTM D1238.

The weight ratio between the polyolefin and the ethylene vinyl acetate copolymer contained in the binder resin is not particularly limited, and for example, the binder resin may include the polyolefin: ethylene vinyl acetate copolymer in a weight ratio of 1:1 to 6:1.

As such, as the binder resin includes the polyolefin resin in an amount equal to or greater than that of the ethylene vinyl acetate copolymer, the release rate of the fertilizer may be more easily controlled.

Meanwhile, the photocatalytic composite may have a structure in which the surfactant having an HLB value of 1 to 6 is bonded to the surface or inside of the aggregates of inorganic fine particles.

As described above, the aggregates of inorganic fine particles can act as a photocatalyst, and when the controlled-release fertilizer is exposed to the surface of the soil or the like, it becomes possible to initiate a photodegradation reaction in the photodegradable capsule.

The surfactant having an HLB value of 1 to 6 is bonded to the surface or inside of the aggregates of inorganic fine particles, and consequently, it prevents the aggregates of inorganic fine particles from growing excessively and makes it possible to have higher compatibility with the binder resin so that the photocatalytic composite can be uniformly dispersed in the binder resin.

The surfactant having an HLB value of 1 to 6 may be SPAN120, SPAN83, SPAN85, SPAN80, SPAN60, SPAN40, polyethylene-block-polyethylene glycol, Brij 52, Brij 72, Brij 93, Triton X35, Triton X15, PEGNOL 24-O Lecithin, Monoolein, Phytantriol; or a mixture or copolymer of two or more thereof In the photocatalytic composite, the weight ratio between the aggregates of inorganic fine particles and the surfactant having an HLB value of 1 to 6 is not particularly limited, and the weight ratio or the like can be adjusted by controlling the amount dispersed in the organic solvent according to the characteristics of the controlled-release fertilizer.

For example, the photocatalytic composite may contain 0.1 to 50 parts by weight or 1 to 20 parts by weight of the surfactant having an HLB value of 1 to 6 relative to 100 parts by weight of the aggregates of inorganic fine particles.

Meanwhile, the aggregates of inorganic fine particles may be contained in an amount of 0.05 to 8 parts by weight or 0.1 to 5 parts by weight relative to 100 parts by weight of the binder resin.

If the content of the aggregates of inorganic fine particles relative to the binder resin in the photodegradable capsule is too low, the efficiency of photodegradation reaction may be lowered, and due to the insufficient photodegradation reaction, the entire photodegradable capsule may not be degraded and residues may remain.

Further, if the content of the aggregates of inorganic fine particles relative to the binder resin in the photodegradable capsule is too large, the aggregates of inorganic fine particles may excessively grow, and thereby, a local photodegradation reaction may occur in the photodegradable capsule, or the efficiency of the photodegradation reaction may be lowered. As a result, the entire photodegradable capsule may not be degraded and residues may remain.

Meanwhile, the controlled-release fertilizer may further include a filler dispersed in the binder resin.

The type of the filler is not particularly limited, and for example, the filler may include talc, bentonite, loess, diatomaceous earth, silica, aluminosilicate, kaolinite, starch, carbon, or a mixture of two or more thereof.

The content of the filler is not particularly limited, but in consideration of the mechanical properties and structural stability of the photodegradable capsule, the controlled-release fertilizer may include 10 to 300 parts by weight or 50 to 200 parts by weight of the filler relative to 100 parts by weight of the binder resin.

The fertilizer may be various known fertilizers, for example, a urea or compound fertilizer.

In a preferred embodiment, the fertilizer may be a granular core fertilizer having a granular form in order to be easily included in the photodegradable capsule.

The specific types of the fertilizer are not limited, and commonly known fertilizers may be used.

Preferable examples of the fertilizer include nitrogen-containing organic compounds such as urea, aldehyde-condensed urea, isobutyl aldehyde-condensed urea, formaldehyde-condensed urea, guanyl urea sulfate, and oxamide; ammonium and nitrate compounds such as ammonium nitrate, ammonium dihydrogen phosphate, diammonium hydrogen phosphate, ammonium sulfate, ammonium chloride, and sodium nitrate; potassium salts such as potassium nitrate, potassium phosphate, potassium sulfate, and potassium chloride; calcium salts such as calcium phosphate, calcium sulfate, calcium nitrate, and calcium chloride; magnesium salts such as magnesium nitrate, magnesium chloride, magnesium phosphate, and magnesium sulfate; iron salts such as ferrous nitrate, ferric nitrate, ferrous phosphate, ferric phosphate, ferrous sulfate, ferric sulfate, ferrous chloride and ferric chloride; and double salts thereof or a mixture of two or more thereof.

The content of the fertilizer in the controlled-release fertilizer is not particularly limited, and for example, it may be contained in an amount of 200 to 3,000 parts by weight relative to 100 parts by weight of the photodegradable capsule.

The photocatalytic composite may have a degree of dispersion unique to the photodegradable capsule.

More specifically, the photocatalytic composite may be prepared through the step of dispersing the surfactant having an HLB value of 1 to 6 in an organic solvent.

By transferring a strong energy using sonication, a high-shear mixer or a bead mill, etc., in at state where the inorganic fine particles and the surfactant having an HLB value of 1 to 6 are dispersed in an organic solvent, the surfactant having an HLB value of 1 to 6 may be bonded to the surface or inside of the aggregates of inorganic fine particles.

The photocatalytic composite thus prepared can be very uniformly dispersed in the binder resin and thereby, the degradation efficiency of the photocatalyst can be remarkably enhanced.

The controlled-release fertilizer may further include a component contained in known controlled-release fertilizers.

For example, such component may include, but not limited to, an amphipathic polymer, etc.

Meanwhile, the controlled-release fertilizer may be provided through various preparation methods. For example, it may be prepared by the preparation method including the steps of preparing a dispersion solution of the photocatalytic composite; preparing a coating composition by mixing a polyolefin, an ethylene vinyl acetate copolymer, the dispersion solution of the photocatalytic composite, and optionally a filler; and coating the surface of the granular fertilizer core with the coating composition.

Specific examples of the organic solvent are not particularly limited, and tetrachloroethylene (TCE), cyclohexene (CHN), dichloromethane (DCM), or 1,2,4-trichlorobenzene (TCB) or the like may be used.

In the step of preparing a dispersion solution of the photocatalytic composite, the dispersion solution may be prepared using a strong energy, such as sonication or a bead mill, etc. For example, a dispersion in which the dispersion particle size of the photocatalyst is 5 to 1000 nm and the cross-sectional diameter of the aggregates of the inorganic fine particles is 0.05 µm to 0.8 µm is produced by using a strong energy such as sonication or the like. According to the present invention, there can be provided a controlled-release fertilizer having a high stability against moisture and a rigid structure, and capable of easily controlling a release period of a fertilizer and further realizing excellent photodegradation efficiency.

The controlled-release fertilizer can prevent soil contamination or the like by preventing a photodegradable capsule or a hydrophilic polymer from remaining in the soil.

BRIEF DESCRIPTION OF DRAWINGS

FIG. 1 schematically shows the photodegradation mechanism of the controlled-release fertilizer.

DETAILED DESCRIPTION

The present invention will be described in more detail with reference to the following examples. However, these examples are given for illustrative purposes only, and the scope of the invention is not intended to be limited to or by these examples.

EXAMPLES

Preparation of Controlled-Release Fertilizer

Examples 1 to 5

(1) Preparation of Photocatalytic Composite 0.09 g of the surfactant shown in Table 1 below was dissolved in tetrachloroethylene, to which $TiO_2$ (average particle diameter of primary particles: 21 nm) was mixed in an amount shown in Table 1 below, and the mixture was sonicated and stirred for 20 minutes. Thereby, a dispersion of a photocatalytic composite in which the surfactant was bonded to the surface and inside of the aggregates of inorganic fine particles was prepared.

(2) Preparation of Controlled-Release Fertilizer

The dispersion solution of the photocatalytic composite prepared above, polyethylene[LDPE, MI(melt index, 190° C., load of 2.16 kg, ASTM D1238): about 8 g/10 min, D(density): 0.925 g/cm], ethylene vinyl acetate copolymer [MI(melt index, 190° C., load of 2.16 kg, ASTM D1238): about 1.8 g/10 min, D(density): 0.94 g/cm$^3$, vinyl acetate content of about 20 wt %, melting point of 85° C.], and talc were used in an amount shown in Table 1 below and uniformly stirred and mixed with tetrachloroethylene at 90° C. in the composition ratio shown in Table 1 below to prepare a coating solution so as to have a solid component concentration of 5 wt %.

Then, the coating solution was applied to the nitrogen fertilizer particles using a fluid bed drier to prepare a controlled-release coated fertilizer (Examples 1 to 5).

Comparative Examples 1 to 3

Preparation of Coated Fertilizer

Comparative Example 1

Polyethylene [LDPE, MI(melt index, 190° C., load of 2.16 kg, ASTM D1238): about 8 g/10 min, D(density): 0.925 g/cm$^3$], ethylene vinyl acetate copolymer [MI(melt index, 190° C., load of 2.16 kg, ASTM D1238): about 1.8 g/10 min, D(density): 0.94 g/cm$^3$, vinyl acetate content of about 20 wt %, melting point of 85° C.], and talc were used in an amount shown in Table 2 below and uniformly stirred and mixed with tetrachloroethylene at 100° C. in the composition ratio shown in Table 2 below to prepare a coating solution so as to have a solid component concentration of 5 wt %.

Then, the coating solution was applied to the nitrogen fertilizer particles using a fluid bed drier to prepare a coated fertilizer (Comparative Example 1)

Comparative Examples 2 to 3

The controlled-release coated fertilizers (Comparative Examples 2 and 3) were respectively prepared in the same manner as in Comparative Example 1, except that the surfactants were changed as shown in Table 2 below.

Experimental Example

Experimental Example 1

Comparison Test of Photodearadation Characteristics 5 g of each of the controlled-release fertilizers of Examples and Comparative Examples and the coated fertilizers of Comparative Examples was taken, and a pinhole was made with a needle for each fertilizer grain. The degradation evaluation was performed on the coating film remaining after the internal fertilizer was completely released.

A light having a wavelength of 300 nm to 800 nm was irradiated to the coating film at an intensity of 400 w/m$^2$ at a temperature of 50° C. using a Suntest CPS+equipment (ATLAS).

Then, when light was irradiated for 224 hours under the above conditions, the degradation rate of the binder resin derived from the weight change of the coating film was determined by the following general formula 1, and the results are shown in Tables 1 and 2 below, respectively.

[General Formula 1]

$$\text{Photodegradation Rate} = \frac{\text{Change in weight of the coating film after UV irradiation}}{\text{Weight of resin in the coating film before UV irradiation}} \times 100\%$$

$$(LDPE + EVA)$$

TABLE 1

|  | Example 1 | Example 2 | Example 3 | Example 4 | Example 5 |
|---|---|---|---|---|---|
| Polyethylene (LDPE) | 28 g | 28 g | 28 g | 28 g | 28 g |
| EVA copolymer | 7 g | 7 g | 7 g | 7 g | 7 g |
| TALC | 65 g | 65 g | 65 g | 65 g | 65 g |
| TiO$_2$ | 0.7 g | 0.7 g | 0.7 g | 0.7 g | 0.7 g |
| TiO$_2$ dispersion treatment | ○ | ○ | ○ | ○ | ○ |
| Surfactant (HLB value) | Span80 0.09 g (HLB 4) | Brij 93 0.09 g (HLB 4) | Lecithin 0.09 g (HLB 4) | Oleic acid 0.09 g (HLB 1) | Polyethylene-block-polyethylene glycol (Ethylene oxide, 20 wt %) 0.09 g |

TABLE 1-continued

| | Example 1 | Example 2 | Example 3 | Example 4 | Example 5 |
|---|---|---|---|---|---|
| Degradation rate of binder resin (%) | 50 ± 3 | 41 ± 3 | 65 ± 3 | 49 ± 3 | (HLB 4) 44 ± 3 |

TABLE 2

| | Comparative Example 1 | Comparative Example 2 | Comparative Example 3 |
|---|---|---|---|
| Polyethylene (LDPE) | 28 g | 28 g | 28 g |
| EVA copolymer | 7 g | 7 g | 7 g |
| TALC | 65 g | 65 g | 65 g |
| $TiO_2$ | 0.7 g | 0.7 g | 0.7 g |
| $TiO_2$ dispersion treatment | — | ○ | ○ |
| Surfactant (HLB value) | | Pluronic F127 0.09 g (HLB: 22) | Triton X-405 0.09 g (HLB: 17.6) |
| Degradation rate of binder resin (%) | 30 ± 8 | 29 ± 8 | 30 ± 8 |

As shown in Table 2, it was confirmed that the controlled-release fertilizers of Examples showed a degradation rate of binder resin of 40% or more, or 50% or more when irradiated with a light having a wavelength of 300 nm to 800 nm at an intensity of 400 w/m² for 224 hours. In contrast, it was confirmed that the coated fertilizers of Comparative Examples showed a degradation rate of binder resin of 30% or less.

Experimental Example 2

Measurement of Z-Average Dispersion Particle Size of $TiO_2$

The z-average dispersion particle sizes of $TiO_2$ in the dispersion solution of the photocatalytic composite of Example 1 and the dispersion solution containing $TiO_2$ of Comparative Example 1 were measured using a Dynamic Light Scattering instrument (Malvern Zetasizer Nano ZS90).

The results are shown in Table 3 below.

TABLE 3

| Z-average dispersion particle size of $TiO_2$ | | |
|---|---|---|
| | Example 1 | Comparative Example 1 |
| z-average dispersion particle size of $TiO_2$ (nm) | 556 | About $2.0 \times 10^4$ |

As shown in Table 3, it is confirmed that the dispersion solution of the photocatalytic composite of Example 1 had a z-average dispersion particle size of about 556 nm, and thus $TiO_2$ particles used were homogeneously dispersed and the aggregates of inorganic fine particles having a relatively small average particle size were formed.

In contrast, it is confirmed that TiO2 of the dispersion solution containing $TiO_2$ of Comparative Example 1 had a z-average dispersion particle size of about 10,000 nm or more, and thus aggregates of inorganic fine particles having a relatively large average particle size were formed.

The invention claimed is:

1. A controlled-release fertilizer, comprising:
   a photodegradable capsule including a binder resin containing a polyolefin and an ethylene vinyl acetate copolymer; and a photocatalytic composite in which a surfactant having an HLB value of 1 to 6 is bonded to a surface or inside of aggregates of inorganic fine particles, and
   a fertilizer contained in a space surrounded by the photodegradable capsule.

2. The controlled-release fertilizer of claim 1, wherein the binder resin has a degradation rate of 40% or more which is derived from a weight change of the photodegradable capsule after irradiating a light having a wavelength of 300 to 800 nm to the fertilizer at an intensity of 400 w/m² for 224 hours.

3. The controlled-release fertilizer of claim 1, wherein the inorganic fine particles include a primary particle having a cross-sectional diameter of 5 to 50 nm.

4. The controlled-release fertilizer of claim 1, wherein the aggregates of inorganic fine particles have a cross-sectional diameter of 1 μm or less.

5. The controlled-release fertilizer of claim 1, wherein the aggregates of inorganic fine particles have a cross-sectional diameter of 0.05 μm to 0.8 μm.

6. The controlled-release fertilizer of claim 1, wherein the inorganic fine particles are titanium dioxide ($TiO_2$), zinc oxide (ZnO), or a mixture thereof.

7. The controlled-release fertilizer of claim 1, wherein the photocatalytic composite includes 0.1 to 50 parts by weight of the surfactant having an HLB value of 1 to 6 relative to 100 parts by weight of the aggregates of inorganic fine particles.

8. The controlled-release fertilizer of claim 1, wherein the aggregates of inorganic fine particles are contained in an amount of 0.05 to 8 parts by weight relative to 100 parts by weight of the binder resin.

9. The controlled-release fertilizer of claim 1, wherein a weight ratio of the polyolefin: ethylene vinyl acetate copolymer in the binder resin is 1:1 to 6:1.

10. The controlled-release fertilizer of claim 1, wherein the polyolefin is at least one selected from the group consisting of a high-density or low-density polyethylene, a linear low-density polyethylene, a polypropylene, an ethylene-propylene copolymer, a polybutene, a butene-ethylene copolymer and a butene-propylene copolymer.

11. The controlled-release fertilizer of claim 1, wherein the ethylene vinyl acetate copolymer includes 1 to 45% by weight of the vinyl acetate repeating unit.

12. The controlled-release fertilizer of claim 1, wherein the surfactant having an HLB value of 1 to 6 includes at least one selected from the group consisting of SPAN120, SPAN83, SPAN85, SPAN80, SPAN60, SPAN40, polyethylene-block-polyethylene glycol, Brij 52, Brij 72, Brij 93, Triton X35, Triton X15, PEGNOL 24-0, Lecithin, Monoolein, and Phytantriol.

13. The controlled-release fertilizer of claim 1, further comprising a filler dispersed in the binder resin.

14. The controlled-release fertilizer of claim 13, wherein the filler is contained in an amount of 10 to 300 parts by weight relative to 100 parts by weight of the binder resin.

15. The controlled-release fertilizer of claim 1, wherein the fertilizer is a granular fertilizer.

\* \* \* \* \*